No. 682,928. Patented Sept. 17, 1901.
N. GOODIER & T. POLLITT.
MOTOR MECHANISM.
(Application filed Dec. 4, 1900.)

(No Model.) 5 Sheets—Sheet 1.

WITNESSES: INVENTORS.
Nicholas Goodier
Thomas Pollitt
BY Richards
ATTORNEYS

No. 682,928.  
Patented Sept. 17, 1901.

N. GOODIER & T. POLLITT.
MOTOR MECHANISM.
(Application filed Dec. 4, 1900.)

(No Model.)  
5 Sheets—Sheet 3.

No. 682,928. Patented Sept. 17, 1901.
N. GOODIER & T. POLLITT.
MOTOR MECHANISM.
(Application filed Dec. 4, 1900.)
(No Model.) 5 Sheets—Sheet 4.

WITNESSES:
INVENTORS
Nicholas Goodier
Thomas Pollitt
BY
ATTORNEYS

No. 682,928. Patented Sept. 17, 1901.
N. GOODIER & T. POLLITT.
MOTOR MECHANISM.
(Application filed Dec. 4, 1900.)
(No Model.) 5 Sheets—Sheet 5.
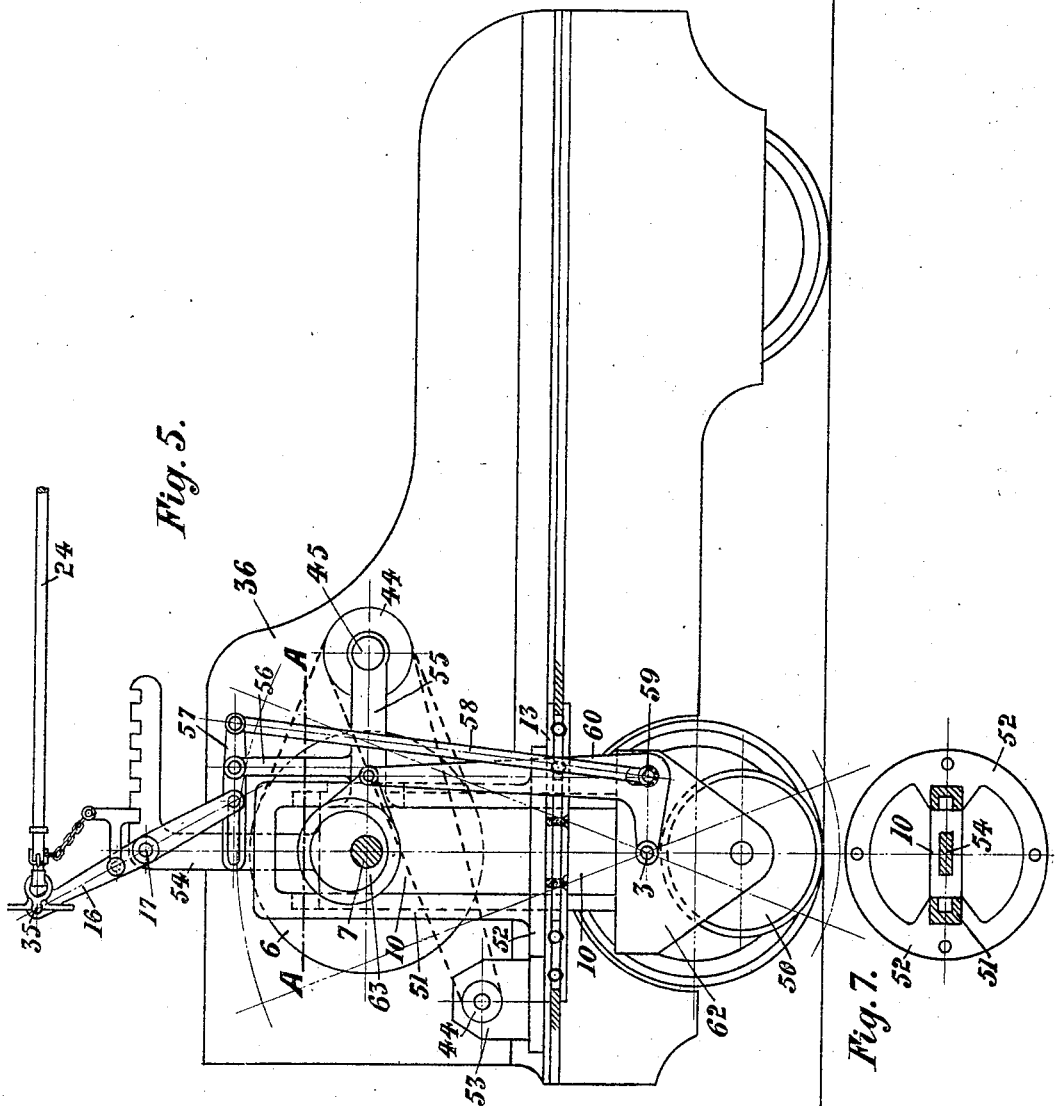
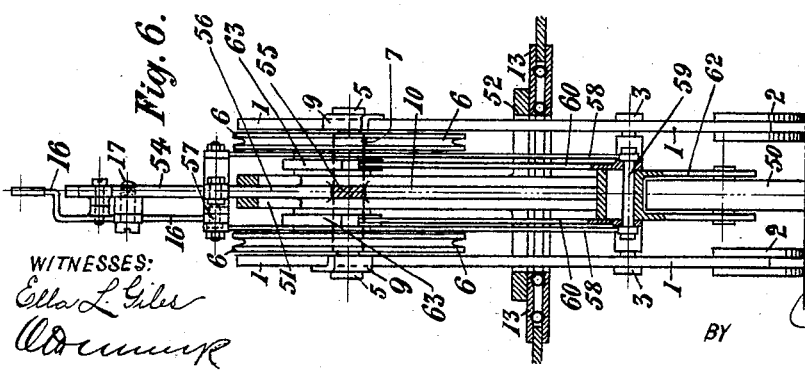

UNITED STATES PATENT OFFICE.

NICHOLAS GOODIER AND THOMAS POLLITT, OF MANCHESTER, ENGLAND.

MOTOR MECHANISM.

SPECIFICATION forming part of Letters Patent No. 682,928, dated September 17, 1901.

Application filed December 4, 1900. Serial No. 38,626. (No model.)

*To all whom it may concern:*

Be it known that we, NICHOLAS GOODIER and THOMAS POLLITT, subjects of the Queen of England, residing at Hulme, Manchester, England, have invented certain new and useful Improvements in or Connected with Motor Mechanisms, of which the following is a specification.

This invention has reference to motor mechanisms for propelling road, railway, and tramway vehicles or the like and also for operating stationary machinery; and it has for its object to provide a new or improved mechanism by which, primarily, the propulsion of road-vehicles or street or other tramways or railways may be effected with less power and weight and generally in a more efficient manner than by the systems and methods at present in vogue. At the same time the object has been to provide generally a mechanism for transmitting or applying power to stationary machinery or apparatus which shall be more economical and efficient than those at present employed.

The mode of motion on which this invention is based is that resembling the leg motion of an animal—say a horse—and the mechanism for effecting it is so arranged and contrived that its own weight, similarly as that of a horse or animal, serves to produce the tractive friction or grip between its motor members and the ground-surface, in contact with which the tractive parts act.

This invention will be described with the aid of the accompanying drawings, which illustrate it as applied to a self-propelled tractor or vehicle for use on common roads and streets.

Figure 1:
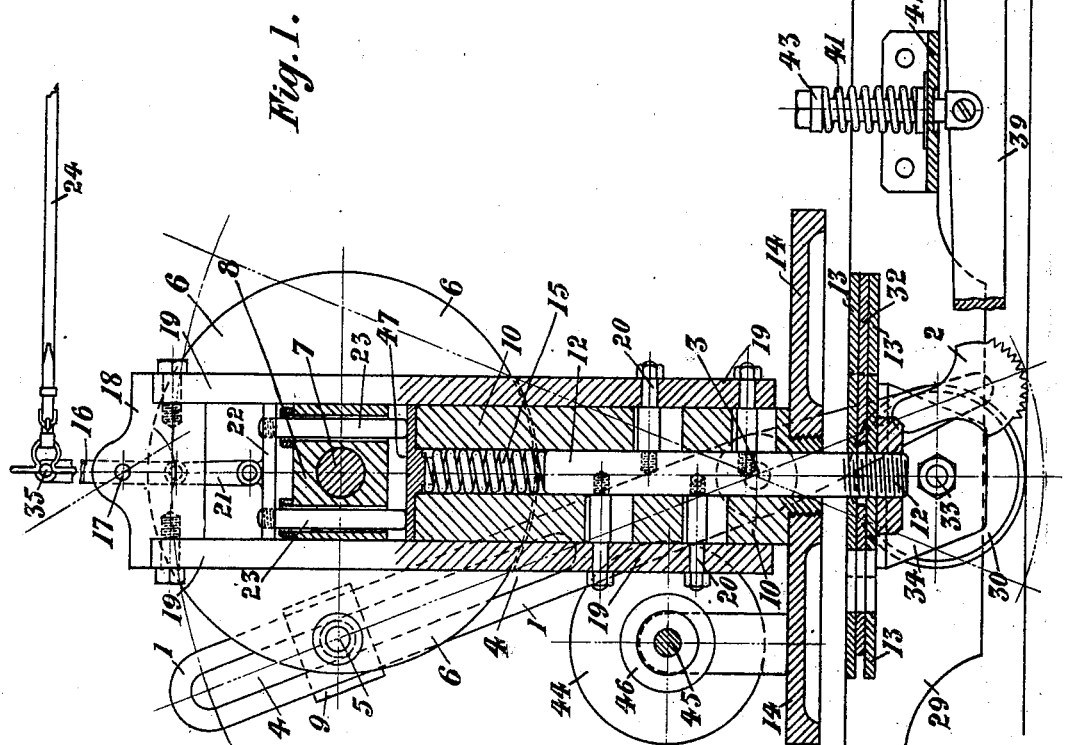
Figure 2:
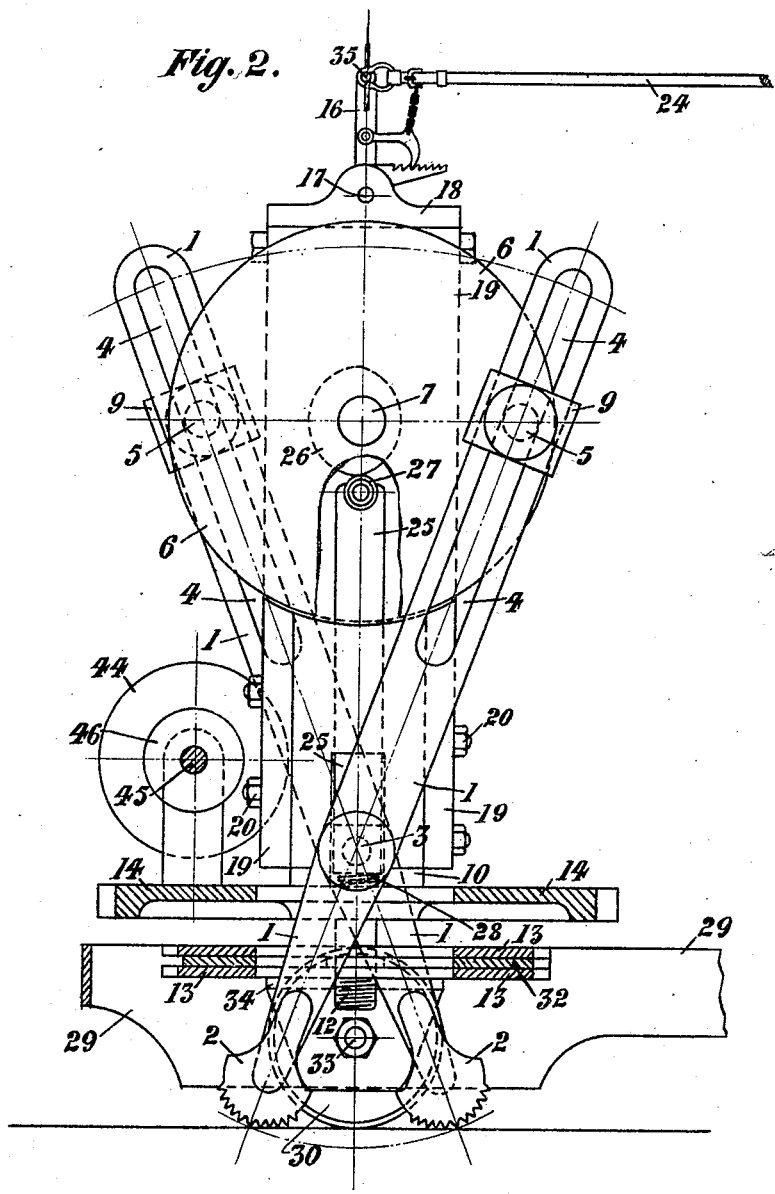
Figure 3:
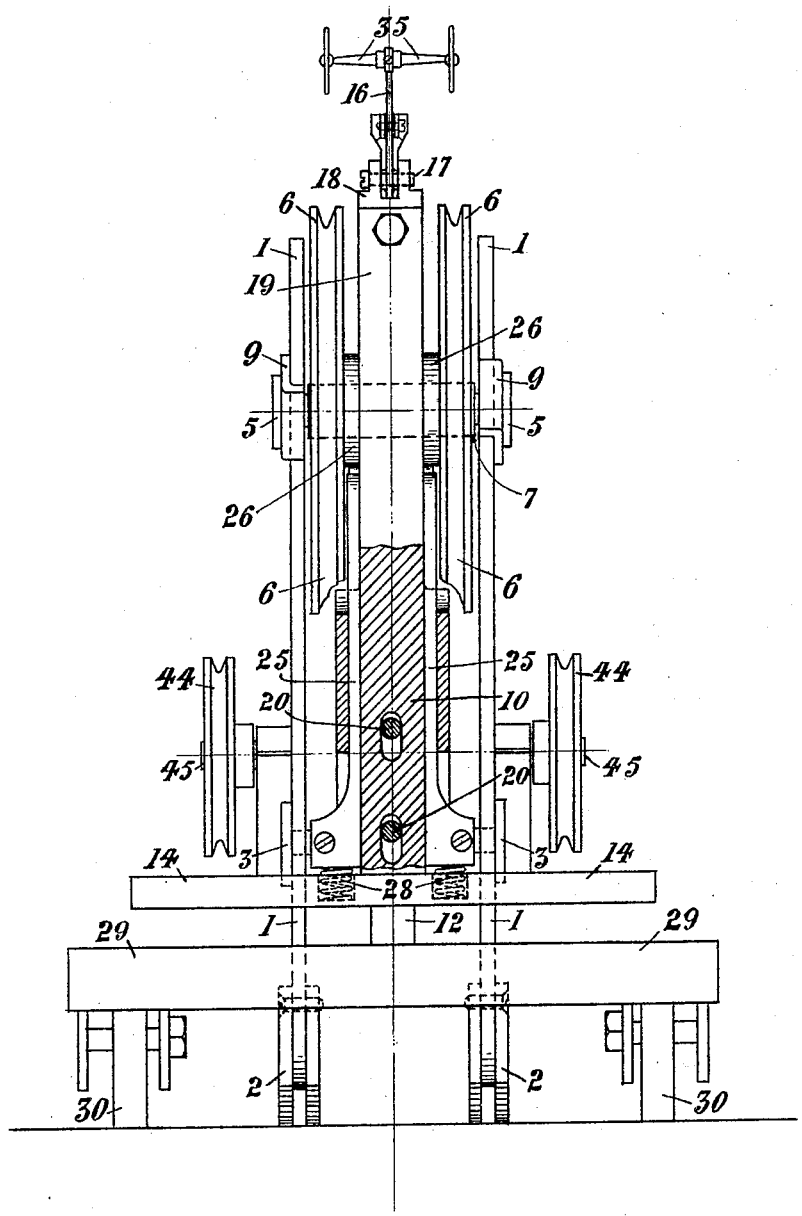
Figure 4:
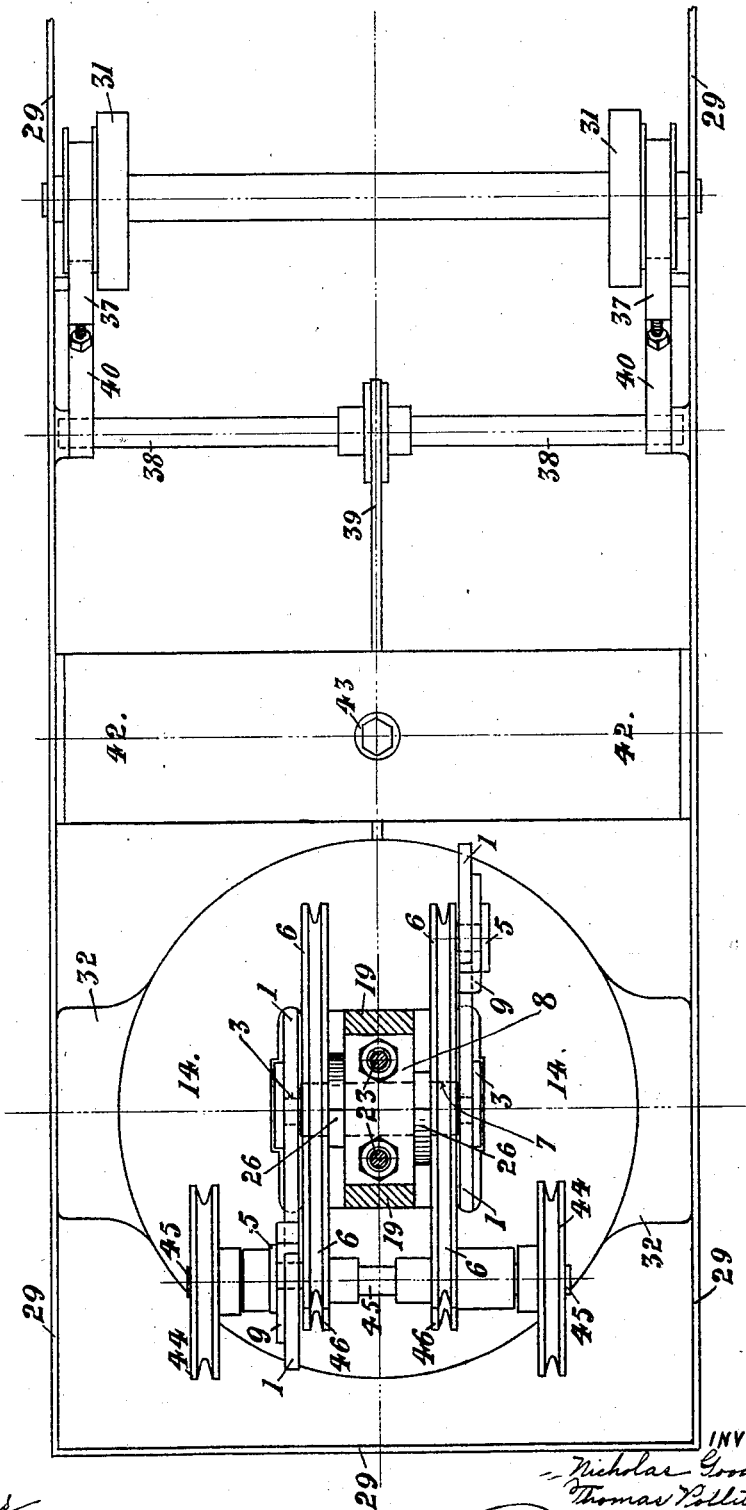

In the drawings two modifications are shown. The first is illustrated in Figures 1 to 4. Of these, Fig. 1 is a side elevation in section, showing the vehicle according to this invention. Fig. 2 is an outside elevation of same. Fig. 3 is an end view showing the vehicle, and Fig. 4 is a plan of same.

In the other modification, Fig. 5 is a side elevation. Fig. 6 is an end view; and Fig. 7, a plan in section at A A, Fig. 5, showing a modified arrangement of parts.

In the different figures the same characters of reference are used to denote the same or corresponding parts wherever they occur in the drawings.

Referring in the first instance to Figs. 1 to 4, 1 represents the main motion levers or legs, and 2 the shoes on the lower ends of same, which serve to produce the tractive and propelling action, the shoes 2 being adapted to be brought in contact with the road or street surface in one stroke and in the return stroke removed from it and brought into a position of action for the next active stroke. There are two of these levers or legs, one on either side of the machinery. These levers or legs are supported at 3 on journals, which constitute the fulcra of same, while their upper ends are provided with slots 4, in which pins 5, fixed on the crank-disks 6, work, as hereinafter described. The crank-disks 6 are mounted on a shaft 7, supported in a bearing 8, and the pins 5, which are carried in these disks, also carry sleeves 9, which surround the legs or levers 1 and which slide up and down on same as the disks 6 are revolved. The bearing 8 for the shaft 7 is connected with the pedestal 10 and moves with it, and this pedestal is mounted on the central fixed column 12, which is supported in the swiveling plate 13, connected with the truck or frame of the vehicle below, as hereinafter described. On the lower end of the pedestal 10 is a platform 14, which may carry the electric motor which drives the disks 6. All these parts are supported and carried by the column 12 when the machinery is out of action and by a spring 15 between the upper end thereof and a plate 47 on the upper end of the pedestal 10.

When it is desired to put the machinery into action, the spring 15 is pressed down, and this is effected by the lever 16, hinged at 17 in the headpiece 18, which is supported from the central column 12 by the vertical bars 19 and studs 20, fixed on the column 12, and by an arm 21 on the cross-head 22 and rods 23, extending down loosely through the bearing 8 and pressing on the upper end of the plate 47. In the position shown in the drawings the lever 16 is in the position in which the spring 15 is compressed to its fullest extent, and in this condition the weight of the pedestel 10, disk 6, platform 14, and motor machinery will come upon or be suspended from the fulcra 3, and thereby would be transmitted to the legs or levers 1. Thus the weight of all this machinery on the legs will give the thrust and grip necessary for the tractive force between the shoes 2 and the road-surface as they alternately come into action, and, further, according to this invention, this weight is regulated and the action of the levers brought into operation or taken out of action by means of the controlling-lever 16, which is operated—that is, pulled—by the reins or controlling connections 24, which are in the hands and under the control of the driver. The levers or legs 1 and disk-pins 5 of the disk 6 are so arranged that when one lever or leg is being moved in one direction the other is being moved in the other direction, and the shoes of these legs or levers are alternately brought down in contact with the road-surface in their acting or propelling stroke and lifted clear of such surface in the return stroke by raising and lowering the fulcra 3 of these levers alternately. This is effected by mounting the fulcra-pins 3 on slides 25, working in guides in the sides of the pedestal 10, these slides being operated by cams 26 on the shaft 7, which act on the rollers 27 on the upper ends of the slides 25. These slides are normally pressed upward by springs 28, which press on the lower end of them. When the half of the cams 26 of the greater diameter are pressing on the rollers 27, the fulcra 3, and with them the levers or legs 1, will be pressed down toward the road-surface, and while this is the condition of the parts the active stroke of the legs will be taking place, while when the other half of the cams 26 are on the rollers the fulcra 3, and with them the legs 1, will be raised off the ground during their return or idle stroke, and this lifting up of the legs and feet off the ground will commence at the return stroke and will continue for a part of such stroke, and then during the remainder of this stroke they will be gradually again moved downward until at the end they will be again pressed onto the ground ready for the next stroke.

In operation the motor levers or legs are oscillated about their fulcra by the motor, and as the lower arm of each lever or leg is moved forward into a position ready for a propelling action its fulcrum which carries it is moved down by the cam, so that it will reach the ground about the beginning of the active stroke, and the weight of the apparatus will then come on it during the whole of this stroke. Then on the end of the stroke the fulcrum is raised by the cam and the end of the leg or lever is moved off the ground and kept off during the return action. The lift is separated from the tractor body or vehicle to which it is attached, and its center action is independent of the same by suspension. In this way the two levers or legs are alternately moved to and fro onto and off the ground, and by their frictional grip with the surface will propel the vehicle along. Their speed of action may be carried to any point that may be required. The carriage or truck in this modification consists of a frame 29, having two sets of wheels 30 and 31. One set 30 and the whole machinery are adapted to revolve about the vertical axis of such machinery. To accomplish this, there is a cross frame or plate 32 secured to the side members of the frame 29, and above and below this are the plates 13, in which the lower end of the column 12 is fixed, while the axles 33 of the wheels 30 are secured to brackets 34, fixed on the under side of the lower plate 13. Hence if the machinery on and connected with the column 12 is revolved about the axis the plate 13, brackets 34, and wheels 30 will also be revolved, and consequently when this takes place the vehicle will be moved out of the normal direction of a straight course. According to this invention this turning movement is effected by the same means as that which governs or controls the whole action of the apparatus—viz., the bringing of the legs into action or taking them out of action. This means consists of the reins 24, of which there are two, each connected at the opposite ends of the cross-bar 35. By pulling on one or other of the reins it will be plain that the whole machinery is turned about its vertical supporting-axis, and with it the wheels 30 and their frame, as just referred to. Over the whole machinery and the back part of the vehicle-frame there is a hood or cover 36, which incloses all the machinery excepting the reins and cross-bar 35. On the back part of the frame the motor storage-cells will be placed and so arranged as to be readily handled and operated. The braking and control of the vehicle are effected by band-brakes 37, connected with the back axle of the wheels 31. The straps of these brakes are worked from a cross-shaft 38, the lever 39, and levers 40, connected with the bands. The lever 39 is worked from its forward end (which comes directly under the machinery) directly from the machinery—that is, as the machinery is lowered when bringing it into action the lever 39 will be lowered, and so the brake-bands 37 will be taken off, and, conversely, when the machinery rises in taking it out of action lever 39 will be raised and the brake-straps 37 put on and the vehicle braked or stopped. The lever 39 is normally pulled upward by a spring 41, supported on the cross-plate 42 and pressing upward a bar 43, which is connected with the lever. The electric motor may be placed on the platform 14 (or other part of the vehicle) and works on the belt-wheels 44, mounted on a counter-shaft 45, and motion from this shaft is conveyed through small pulleys 46 on it to the main disks 6. The wheels 44, driven by the motor, being comparatively large and the wheels 46 small in relation to 6—that is, the gear being speeded down—by this fact, together with the arrangement of motor levers or legs referred to and by their special construction and the suspension system, great leverage and tractive power are obtained.

In the modification shown in Figs. 5, 6, and 7 the spring 15, set forth with reference to Figs. 1 to 4, is dispensed with and the whole machinery carrying the fulcra of the levers or legs 1 normally rest in the ground, being supported by a roller-wheel 50, which runs over the ground, and it is so disposed that it is between the front and back limits of movement of the legs or levers 1, and hence as this roller or wheel will run up and down all unevenness of the road and the relative positions of the feet of the levers with the road-surface are kept constant under all conditions. There are further differences between this modification and the former, to be hereinafter described. The pedestal or main frame 10 in this case works up and down in a slide-frame 51, fixed on the base 52, and this base is supported on the turn-table or plate 13, on which also the motor 53 is carried. On the upper end of this sliding part 10 there is a column 54, on the upper part of which the actuating-lever 16 is mounted, the lever being actuated by reins 24, as described with reference to the first modification. On the side of the frame 10 there is a bracket 55, carrying a counter-shaft 45 and pulley-wheels 44 for conveying motion from the motor 53 to the driving disks or wheels 6, and upon this bracket 55 is another vertical bracket 56, supporting a lever 57, one end of which is slotted and worked by the lever 16 and the other has connected with it connecting-rods 58, the lower ends of which carry the spindle 59, and this spindle carries on either side the lever 60. These bell-crank levers 60 carry the fulcra 3 for the legs or levers 1, and they are operated at their upper ends by the eccentrics 63 on the shaft 7. These levers 60 and eccentrics 63 perform the function of the cams 26 and slides 25 of the apparatus set forth with reference to Figs. 1 to 4, and in action they are adapted to raise and lower the fulcra 3 on the opposite sides of the machine alternately, and so lift the feet of the legs 1 on and off the ground in their active and idle strokes, respectively. The spindle 59, which, as stated, is carried from the lever 57 by the connecting-rods 58, is guided by and free to move up and down in a slot in the head 62 on the lower end of the frame 10, which carries or supports the wheel 50, and accordingly as this spindle 59 is raised or lowered by the levers 16 and 57 of course the legs or levers will be bodily raised off the ground and taken out of action, and vice versa. Mainly in other respects than these just referred to the apparatus and its general action are the same as that of the machinery described with reference to Figs. 1 to 4.

In the application of the invention for driving stationary machinery the levers of the mechanisms are adapted to act upon the periphery of a wheel mounted in a suitable frame, from the shaft of which the power transmitted to it by the mechanism is given off.

Having now particularly described and ascertained the nature of this invention and in what manner the same is to be performed, we declare that what we claim is—

1. A self-propelled vehicle in which the propelling machinery comprises vibrating upright levers, the lower ends of which are adapted to engage with the surface of the road, and machinery connected with and adapted to vibrate said levers, the weight of said machinery being adapted to rest or be suspended upon the fulcra of the levers when in action, a vertical sliding frame supporting the fulcra of said levers, and adapted to be moved toward and away from the road-surface, substantially as set forth.

2. A self-propelled vehicle in which the propelling machinery comprises vibrating upright levers, the lower ends of which are adapted to engage with the surface of the road, and machinery connected with and adapted to vibrate said levers, the weight of said machinery being adapted to rest or be suspended upon the fulcra of the levers when in action, a vertical sliding frame supporting the fulcra of said levers, and adapted to be moved toward and away from the road-surface, the fulcra being on slides being operated up and down from a revolving part of the driving machinery; substantially as set forth.

3. In a self-propelled vehicle, vibrating upright levers, the lower ends of which are adapted to engage with the surface of the road, a carrier-frame adapted to slide up and down, and having the fulcra of said levers connected with it, a shaft above the fulcra connected with and adapted to slide up and down in connection with the said frame, cranks on said shaft connected with the upper ends of said levers, and adapted to vibrate same by the rotation of said shaft, and moving supports for said fulcra, adapted to be moved up and down in and by each revolution of the shaft; substantially as set forth.

4. A self-propelled vehicle in which the propelling machinery comprises vibrating upright levers, the lower ends of which are adapted to engage with the surface of the road, and machinery connected with and adapted to vibrate said lever, the weight of said machinery being adapted to rest or be suspended upon the fulcra of the levers when in action, a vertical sliding frame supporting the fulcra of said levers, and adapted to be moved toward and away from the road-surface, and controlling means operated by the driver, adapted to raise and lower the said fulcra; substantially as set forth.

5. A self-propelled vehicle in which the propelling machinery comprises vibrating upright levers, the lower ends of which are adapted to engage with the surface of the road, and machinery connected with and adapted to vibrate said levers, the weight of said machinery being adapted to rest or be suspended upon the fulcra of the levers when in action, a vertical sliding frame supporting the fulcra of said levers, and adapted to be moved toward and away from the road-surface, and also rotated about its vertical axis, and a controlling means operated by the driver adapted to raise and lower the said fulcra, and also revolving with the machinery about its vertical axis; substantially as set forth.

6. A self-propelled vehicle in which the propelling machinery comprises vibrating upright levers, the lower ends of which are adapted to engage with the surface of the road and machinery, connected with and adapted to vibrate said levers, the weight of said machinery being adapted to rest or be suspended upon the fulcra of the levers when in action, a vertical sliding frame supporting the fulcra of said levers and adapted to be moved toward and away from the road-surface, and a wheel running on the road and supporting said vertical sliding frame; substantially as set forth.

7. A self-propelled vehicle in which the propelling machinery comprises vibrating upright levers, the lower ends of which are adapted to engage with the surface of the road, and machinery connected with and adapted to vibrate said levers, the weight of said machinery being adapted to rest or be suspended upon the fulcra of the levers when in action, a vertical sliding frame supporting the fulcra of said levers, and adapted to be moved toward and away from the road-surface, and brake mechanism for braking the wheels of the vehicle connected with and worked from the said vertical sliding frame; substantially as set forth.

8. In a self-propelled vehicle, the combination of a vertical sliding frame 10, lever-fulcra 3 supported from said frame, vibrating levers 1 supported upon said fulcra, a shaft 7 about the fulcra adapted to slide up and down with a frame 10, and crank-disk 6, the crank-pins of which are connected with and directly operate the upper end of the levers 1; and controlling means for raising and lowering the said frame; substantially set forth.

In witness whereof we have hereunto set our hands in presence of two witnesses.

NICHOLAS GOODIER.
THOMAS POLLITT.

Witnesses:
JNO. D. BROWN,
GEO. E. GODDING.